(12) United States Patent
Chantz (10) Patent No.: US 8,576,123 B2
(45) Date of Patent: Nov. 5, 2013

(54) METHOD AND SYSTEM FOR VESSEL AUTHENTICATION AND LOCATION VALIDATION

(75) Inventor: Hyman D. Chantz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 12/825,701

(22) Filed: Jun. 29, 2010

(65) Prior Publication Data

US 2011/0316743 A1    Dec. 29, 2011

(51) Int. Cl.
*G01S 5/04* (2006.01)

(52) U.S. Cl.
CPC .......................................... *G01S 5/04* (2013.01)
USPC ........................................... 342/457; 342/465

(58) Field of Classification Search
USPC .......................................... 342/457, 465, 450
See application file for complete search history.

(56) References Cited

U.S. PATENT DOCUMENTS

| | | | |
|---|---|---|---|
| 2,214,342 A | 9/1940 | Neufeld | |
| 3,725,919 A | 4/1973 | Jones et al. | |
| 4,894,662 A | 1/1990 | Counselman | |
| 5,379,047 A | 1/1995 | Yokev et al. | |
| 5,389,936 A | 2/1995 | Alcock | |
| 7,379,388 B2 | 5/2008 | Protoolis et al. | |
| 7,414,573 B2 * | 8/2008 | Murphy | 342/357.21 |
| 7,817,079 B1 * | 10/2010 | Funk | 342/41 |
| 2005/0099891 A1 | 5/2005 | Protoolis et al. | |
| 2006/0181394 A1 * | 8/2006 | Clarke | 340/10.4 |
| 2008/0086267 A1 | 4/2008 | Stolte et al. | |
| 2009/0121940 A1 | 5/2009 | Ladd et al. | |

FOREIGN PATENT DOCUMENTS

| | | |
|---|---|---|
| JP | 08136650 | 5/1996 |
| JP | 2005181078 | 7/2005 |
| JP | 2007207134 | 8/2007 |

* cited by examiner

*Primary Examiner* — Gregory C Issing
(74) *Attorney, Agent, or Firm* — Schmeiser, Olsen & Watts; John Pivnichny (57) ABSTRACT

A method of and system for vessel authentication and location validation. The method includes detecting a radio transmission from a target vessel in a vessel control area; determining a time and date of the radio transmission; generating a triangulated geographical location of the radio transmission; extracting a maritime mobile service identity from the radio transmission; extracting from the radio transmission a frequency, a power level and a waveform of the radio transmission; and authenticating or not authenticating the target vessel based on the triangulated geographical location and one or more of the frequency of the radio transmission, the power level of the radio transmission and the waveform of the radio transmission.

31 Claims, 11 Drawing Sheets

METHOD AND SYSTEM FOR VESSEL AUTHENTICATION AND LOCATION VALIDATION

FIELD OF THE INVENTION

The present invention relates to the field of maritime security; more specifically, it relates to a method and system for vessel authentication and location validation.

BACKGROUND

Illegal and terrorist activities are an ongoing threat at seaports and waterways. While several systems exist for authenticating and determining vessel location within a harbor, waterway or coastal region, methods can be developed to circumvent these systems. Accordingly, there exists a need in the art to mitigate the deficiencies and limitations described hereinabove.

SUMMARY

A first aspect of the present invention is a method, comprising: detecting a radio transmission from a target vessel in a vessel control area; determining a time and date of the radio transmission; generating a triangulated geographical location of the radio transmission; extracting a maritime mobile service identity from the radio transmission; extracting from the radio transmission a frequency, a power level and a waveform of the radio transmission; and authenticating or not authenticating the target vessel based on the triangulated geographical location and one or more of the frequency of the radio transmission, the power level of the radio transmission and the waveform of the radio transmission.

A second aspect of the present invention is a system including two or more remote receiver stations linked to a central station, each remote receiver station including a radio detection finder system, the central station including a computer comprising a processor, an address/data bus coupled to the processor, and a computer-readable memory unit coupled to communicate with the processor, the memory unit containing instructions that when executed by the processor implement a method for authenticating vessel identity and location in a vessel control area, the method comprising the computer implemented steps of: determining a time and date of a radio transmission from a target vessel in a vessel control area; generating a triangulated geographical location of the radio transmission using data transmitted relative to the radio transmission to the central station by the two or more remote receiver stations; extracting and storing a maritime mobile service identity from the radio transmission; extracting from the radio transmission a frequency, a power level and a waveform of the radio transmission; and authenticating or not authenticating the target vessel based on the triangulated geographical location and one or more of the frequency of the radio transmission, the power level of the radio transmission and the waveform of the radio transmission.

A third aspect of the present invention is a computer program product, comprising: a computer useable storage medium having a computer readable program therein, wherein the computer readable program when executed on a computer causes the computer to: detect a radio transmission from a target vessel in a vessel control area; determine a time and date of the radio transmission; generate a triangulated geographical location of the radio transmission based on at least two sets of bearing input data; extract and store a maritime mobile service identity from the radio transmission; extract from the radio transmission a frequency, a power level and a waveform of the radio transmission; and authenticate or not authenticate the target vessel based on the triangulated geographical location and one or more of the frequency of the radio transmission, the power level of the radio transmission and the waveform of the radio transmission.

These and other aspects of the invention are described below.

BRIEF DESCRIPTION OF THE DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION

Figure 1:
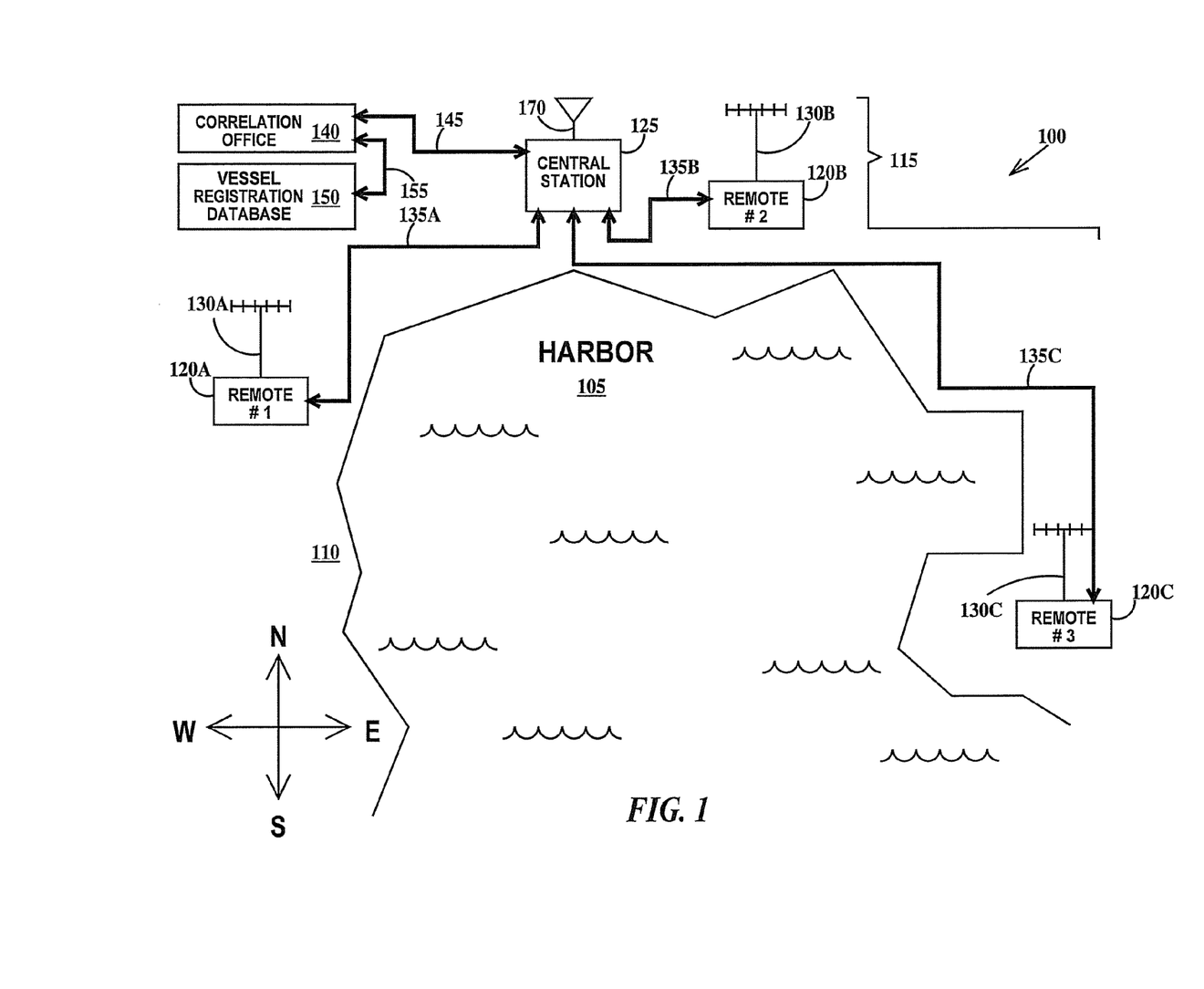
FIG. 1 is a geographical diagram of a vessel authentication and location validation system according to embodiments of the present invention.

FIG. 1 is a geographical diagram of a vessel authentication and location validation system according to embodiments of the present invention. In FIG. 1, a vessel control area 100 includes a harbor 105 and the immediately adjacent land 110. A transportation radio authentication correlation and evaluation (TRACE) facility 115 includes a first remote station 120A, a second remote station 120B and a third remote station 120C connected to a central station 125. Each of remote stations 120A, 120B and 120C includes a respective radio directional radio receiver 130A, 130B and 130C (indicated by the antenna symbols). Each of remote stations 120A, 120B and 120C is linked to central station 125 by respective communications links 135A, 135B and 135C. Communications links 135A, 135B and 135C may be hard connections such as telephone wires or optical cables or wireless connections such as radio or microwave systems. Central station 125 is connected to a local correlation office 140 by a communications link 145. Correlation office 140 is connected to a vessel registration database data base 150 by a communications link 155. Again, communications links 145 and 155 may be hard connections such as telephone wires or optical cables or wireless connections such as radio or microwave systems.

Figure 2:
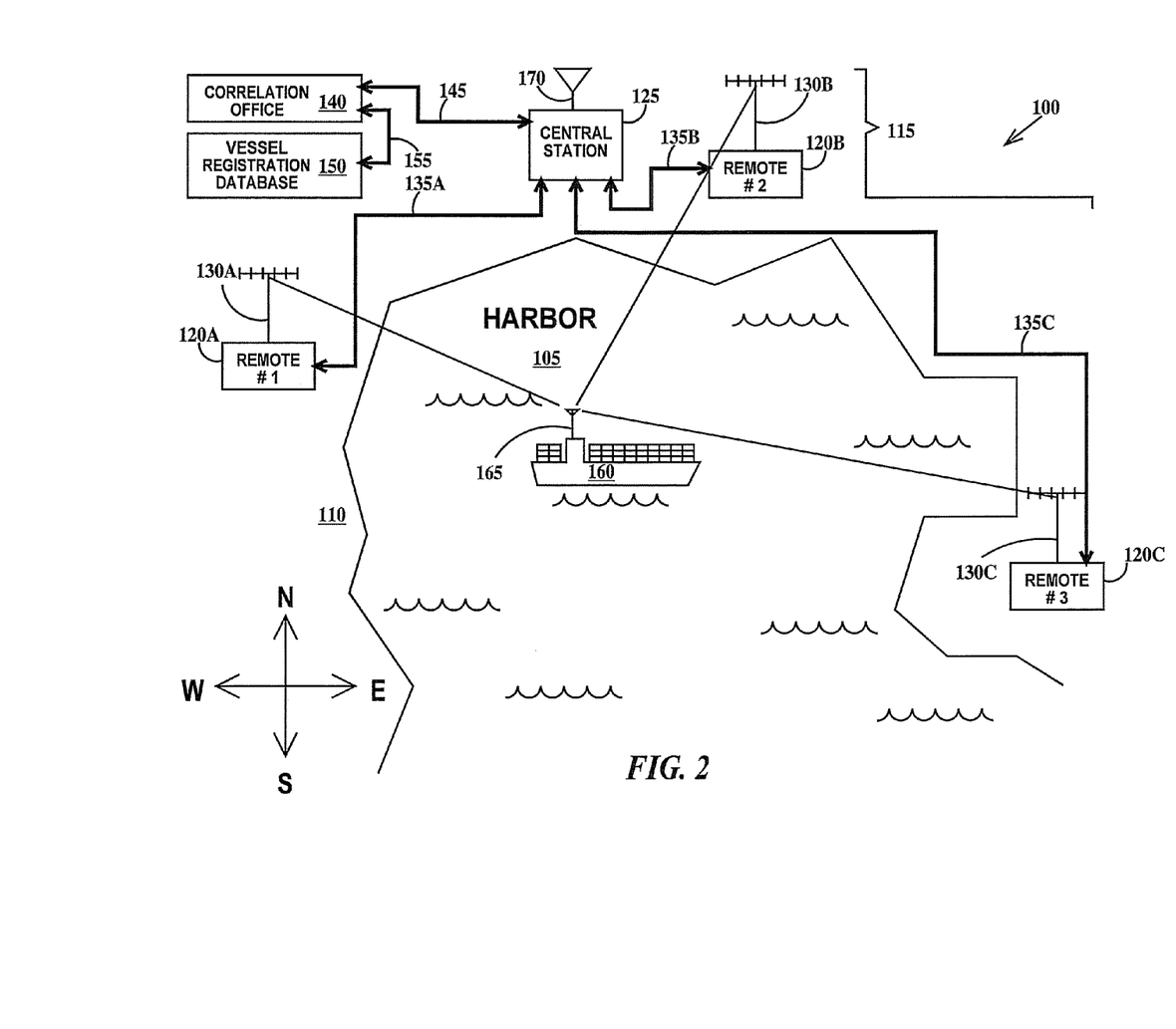
FIG. 2 is a schematic diagram of a vessel authentication and location validation system detecting a vessel in a valid location.

FIG. 2 is a schematic diagram of a vessel authentication and location validation system detecting a vessel in a valid location. In FIG. 2, a vessel 160 having a transmitter 165 broadcasts the vessels maritime mobile service identity (MMSI) and optionally the vessels geographical location and which is received by a receiver 170 (represented by the antenna symbol) of central station 125. A self-identified geographical vessel location (via a link to the vessels global positioning system (GPS)) may be included as coded data in the transmission or reported by voice. The MMSI is a unique nine digit identifier that is assigned to a vessel and is automatically included in each transmission from all of a vessel's transmitters. Central station 125 records frequency and the waveform of the signal transmitted from vessel 160. At the same time, each of remote stations 120A, 120B and 120C detect the vessels transmission and determines a bearing (i.e., direction from the receiving station) and a signal strength (i.e., radio frequency power level) of the vessels transmission received at the remote station and sends the bearing and signal strength to the central station over communications links 135A, 135B and 135C. While three remote stations are illustrated, there may be a few as two or more than three. Alternatively, central station 125 may include one of the remote stations 120A, 120B or 120C.

Central station 125 determines a triangulated geographical location for the vessel from the bearings supplied by remote stations 120A, 120B and 120C. If a self-identified geographical vessel location is supplied by the vessel, central station 125 can determine if the vessel 160 is where it reports to be from the bearing information. In one method, knowing the X, Y coordinates (e.g., latitude and longitude) of each remote station 130A, 130B and 130C and the direction (azimuthal bearing) from each remote station three equations slope-intercept equations may be solved simultaneously to give the a triangulated geographical vessel location. Though two remote stations will suffice in most cases, three remote stations are preferred to guard against the worse case scenario that the vessel and two remote receivers lay on a straight line. In a second method, triangulated geographical vessel location can be hyperbolically calculated from the bearings and the different times the same transmission is received at the remote stations. Knowing the actual vessel location (Xv and Yv) and the location of a remote station (Xs and Ys) the distance to the remote station is simply $\sqrt{(Xr-Xv)^2+(Yr-Yv)^2}$.

Knowing the location of the central station and the triangulated location of the vessel, the vessels actual distance from central station 125 can be determined. Knowing this distance, the frequency of the transmission (generally the 155 MHz marine band) and the received signal strength, the vessel transmitter power can be calculated by $P_{RECEIVED} \approx P_{TRANSMITTED}$ (antenna gain/distance$^2$). The gain of a typical vessel antenna is 3 db (10 log 2) and power level of a typical vessel transmitter is 25 watts. By building a database of known vessel transmitter power cross-referenced by MMSI (e.g., vessel registration database 150 of FIG. 1), transmitter power can be used in authentication of vessels. For example, a power level of 1 watt is more likely to be a hand held transmitter than a transmitter on a vessel and would be suspicious. Vessels may have multiple transmitters, so the transmitter power of all transmitters associated with the vessel should be cross-referenced by MMSI.

Central station 125 can also access records from vessel registration database 150 that indicate one or more of the transmitter power of the vessel associated with the transmitted MMSI, the waveform of the transmitter of the vessel associated with the transmitted MMSI and the frequency offset of the transmitter of the vessel associated with the transmitted MMSI. The retrieved power and waveform are compared to the calculated power and received waveform. If the transmitted, retrieved and calculated MMSI, power level, waveform and location information match, then the vessel is authenticated. If either the MMSI or one or more of signal frequency, power level and waveform do not match, then the vessel is not authenticated and the transmitted, retrieved and calculated MMSI, signal frequency, power level, waveform and location information are sent to correlation office 150 for determination of an action to take. In the example of FIG. 2, at least the location information matches. However, location matching is not sufficient to authenticate the vessel. The MMSI must also match and one or more of frequency offset, waveform and power level must also match.

As a further check, central station 125 may retrieve information as the last known authenticated location (and the date/time at the last known location) of the vessel associated with the MMSI from vessel registration database 150. This information may be used to determine if it is possible for the vessel to have physically sailed from the last known location to the present location in the elapsed amount of time. For example, if the last known location was 2500 nautical miles by the shortest route to the present location and the elapsed time was 10 days and the maximum speed of the vessel is 12 knots, then the vessel could have traveled 2880 nautical miles, but if the elapsed time was 8 days, the vessel could only have traveled 2304 nautical miles which would be suspicious. As a further check, central station 125 may retrieve information as whether or not the vessel associated with the MMSI from vessel is due in the vessel control area 100 at the present time.

Figure 3:
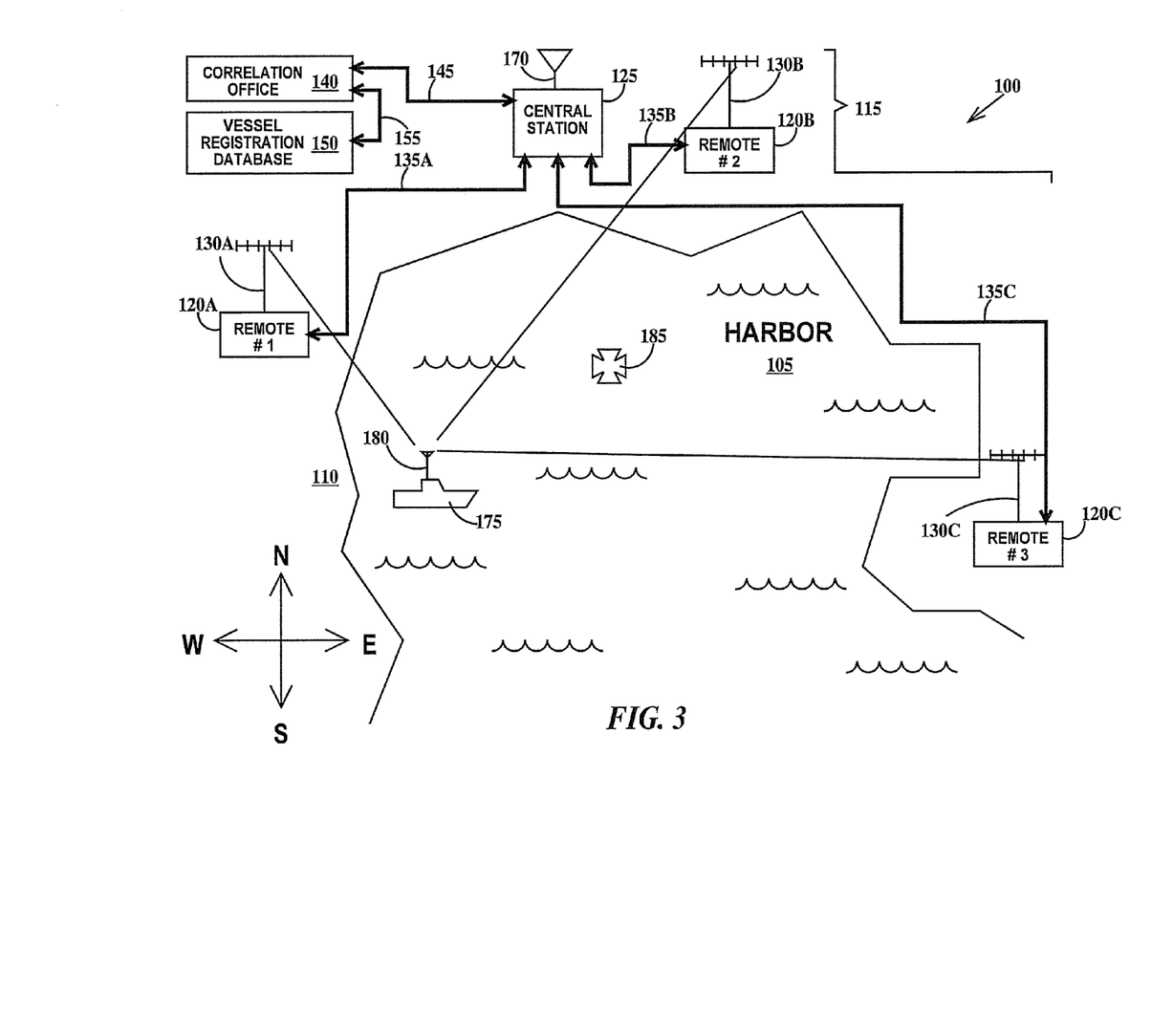
FIG. 3 is a schematic diagram of a vessel authentication and location validation system detecting a vessel in a non-valid location.

FIG. 3 is a schematic diagram of a vessel authentication and location validation system detecting a vessel in a non-valid location. In FIG. 3, a vessel 175 having a transmitter 180 reports its location as 185, but the triangulated location does not match. Thus, vessel 175 would not be authenticated.

Figure 4A:
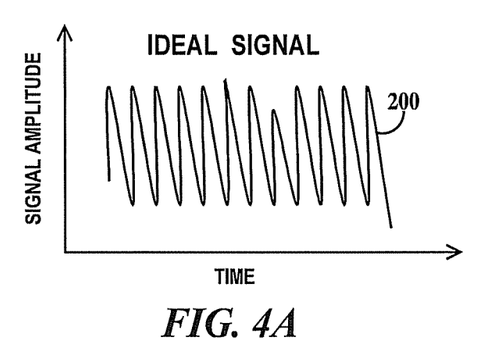
FIG. 4A illustrates an ideal vessel transmission signal waveform.

FIG. 4A illustrates an ideal vessel transmission signal waveform. In FIG. 4A signal amplitude vs. time is plotted for an ideal waveform 200. In FIG. 4A, full power is achieved instantaneously ("key up" time is essentially zero) and the waveform is more or less uniform. It should be understood that FIG. 4A is not to scale, particularly the time axis. Maritime channel 16 (156.8 MHz) would have 156,800,000 cycles per second, but "key up" time may be as long as $\frac{1}{10}$ of a second, so it is not possible to show enough cycles from start of transmission to full power. Therefore, FIG. 4A is a "smoothed" plot, each cycle being an aggregate of many cycles. Likewise signals 225, 230, 235 and 240 of FIG. 5 are "smoothed" plots.

Figure 4B:
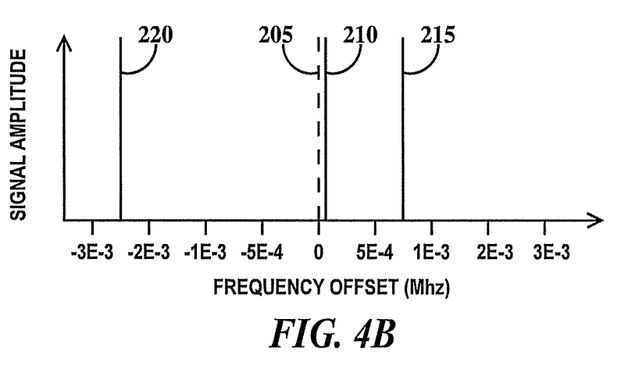
FIG. 4B illustrates vessel authentication by vessel transmission signal frequency offset.

FIG. 4B illustrates vessel authentication by vessel transmission signal frequency offset. In FIG. 4B, signal amplitude is plotted as an offset from a nominal frequency. Vessel transmitters are designed to transmit at the nominal frequency (i.e., maritime channel 16 at 156.8 MHz). However, transmitters can transmit slightly off-frequency and transmit at a frequency close to but different from the nominal frequency. This frequency offset can be used in the identification or authentication of a particular transmitter. In FIG. 4B, the nominal frequency 205 is shown by the dashed line. For channel 16, this is 156.800000 Mhz. For a first vessel's transmitter, the transmitted frequency 210 is offset by 0.000010 MHz high (156.800010 for channel 16). For a second vessel's transmitter, the transmitted frequency 215 is offset by 0.000700 MHz high (156.800750 for channel 16). For a third vessel's transmitter, the transmitted frequency 220 is offset by 0.002500 MHz low (156.797500 for channel 16). A transmitter with this much frequency offset would be suspicious. By building a database (e.g., vessel registration database 150 of FIG. 1) of known vessel transmitter frequency offsets cross-referenced by MMSI, frequency offset can be used in authentication of vessels. Vessels may have multiple transmitters, so the frequency offset of all transmitters associated with the vessel should be cross-referenced by MMSI.

Figure 5:
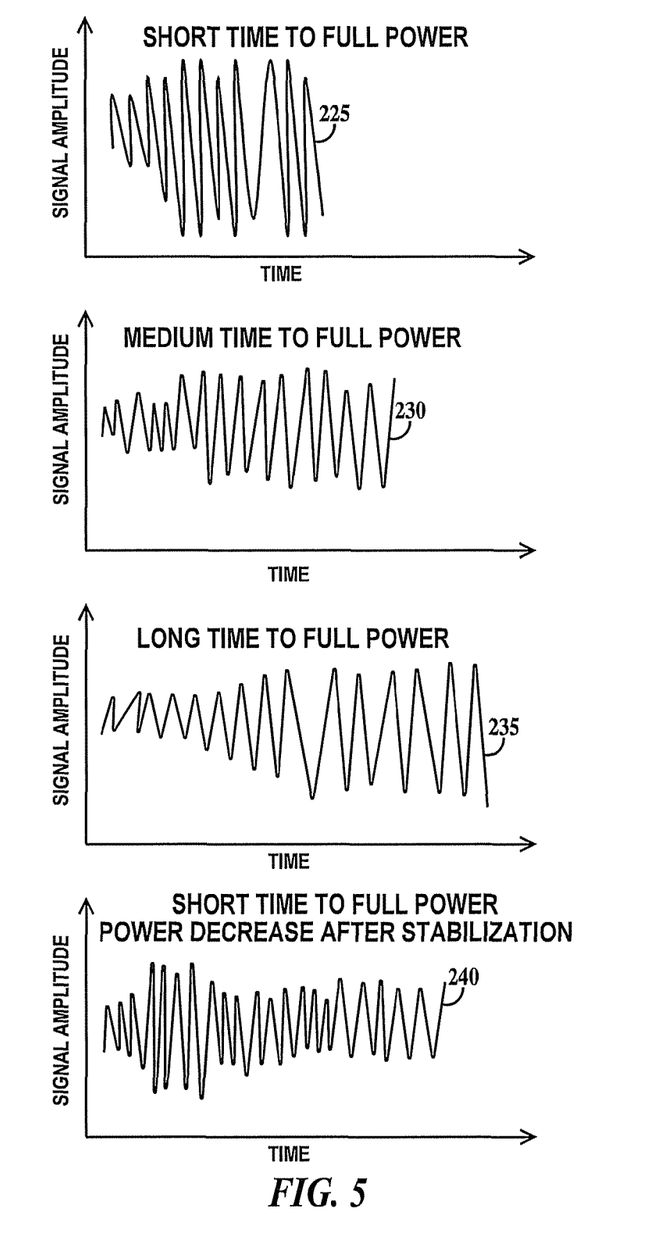
FIG. 5 illustrates vessel authentication by vessel transmission signal waveform.

FIG. 5 illustrates vessel authentication by vessel transmission signal waveform. In FIG. 5, signal amplitude vs. time is plotted. In FIG. 5 waveforms 225, 230, 235 and 240 are given as examples of how transmitter waveforms may be used in vessel authentication. Waveform 225 is exemplary of a transmitter having a short time to full power signal. Waveform 230 is exemplary of a transmitter having a medium time to full power signal. Waveform 235 is exemplary of a transmitter having a long time to full power signal. Waveform 240 is exemplary of a transmitter having a short time to full power signal, followed by a power decrease after stabilization. By building a database of known vessel transmitter waveforms cross-referenced by MMSI (e.g., vessel registration database 150 of FIG. 1), waveforms can be used in authentication of vessels. Vessels may have multiple transmitters, so the waveforms of all transmitters associated with the vessel should be cross-referenced by MMSI.

Figure 6:
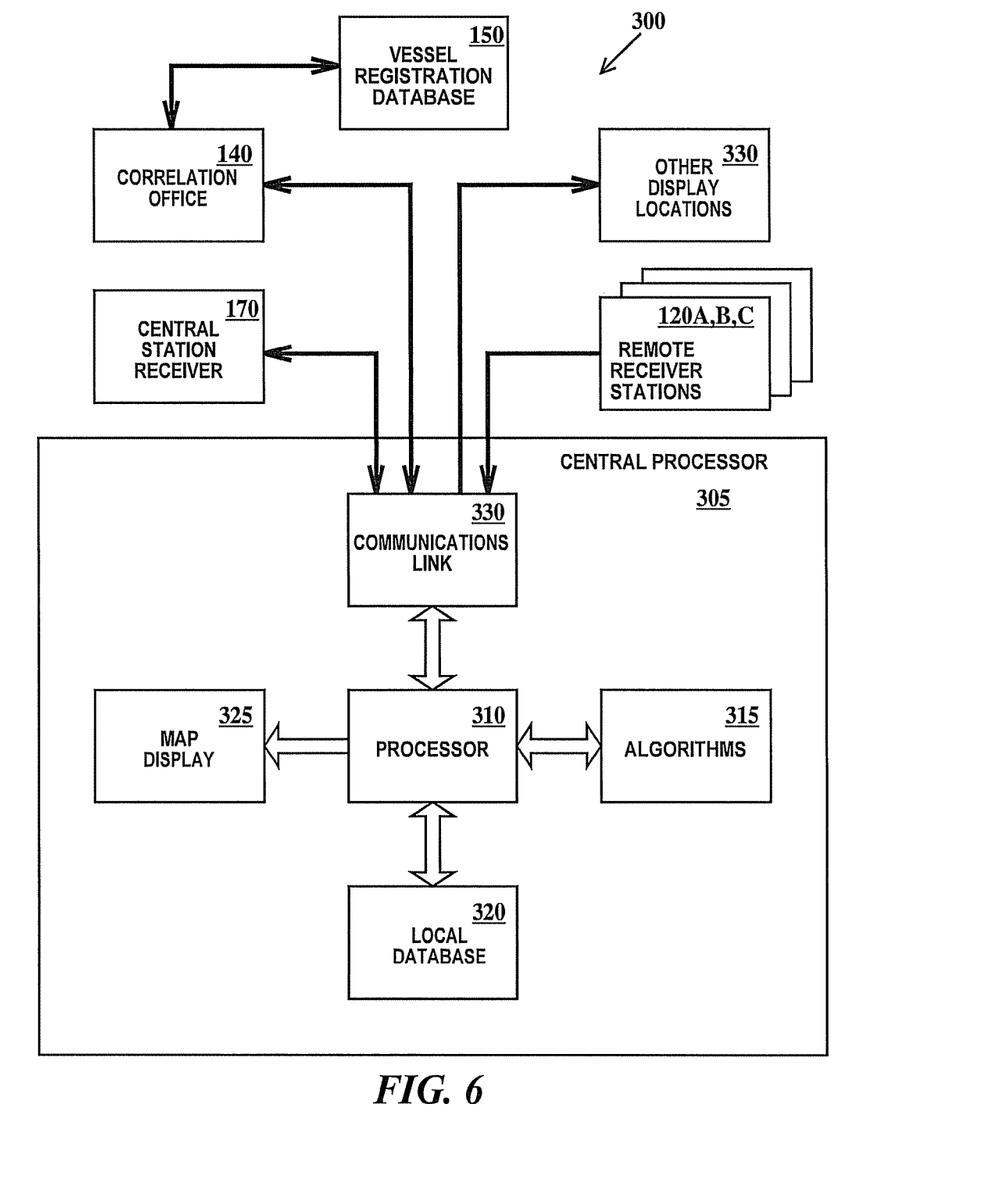
FIG. 6 is a schematic diagram of the vessel authentication and location validation system according to embodiments of the present invention.

FIG. 6 is a schematic diagram of the vessel authentication and location validation system according to embodiments of the present invention. In FIG. 6, a TRACE system 300 includes a central processor 305 (e.g., located in central station 125 of FIG. 1), remote receiver stations 120A, 120B and 120C and vessel registration database 150, correlation office 140 central receiver 170 and other display locations 330. Central processor includes a processor 310 (e.g., a microprocessor and memory, see FIG. 11), algorithms 315 accessible by processor 310, a local data base 320 accessible by processor 310, a map display 325 accessible by processor 310 and a communications link 330. Communications link 330 is connected between processor 310 and remote receiver stations 120A, 120B and 120C, correlation office 140, central station receiver 170 and other display locations 330. Vessel registration database 150 is connected to correlation office 140. Algorithms 335 may be embodied in a fixed data storage unit or a removable data storage media. Algorithms 335 include algorithms for calculating a triangulated vessel location and distance, calculating vessel transmitter power levels, determining frequency off-sets, and comparing frequency waveforms. Local database 320 stores information received from remote receiver stations 120A, 120B and 120C, vessel registration database 150. Map display 325 displays a graphical representation of vessel control area 100 (see FIG. 1) and the self-reported and triangulated locations of vessels in the vessel control area. Examples of other display locations include, but are not limited to, military bases, local fire, police and emergency services and various government emergency control offices.

Figure 7A:
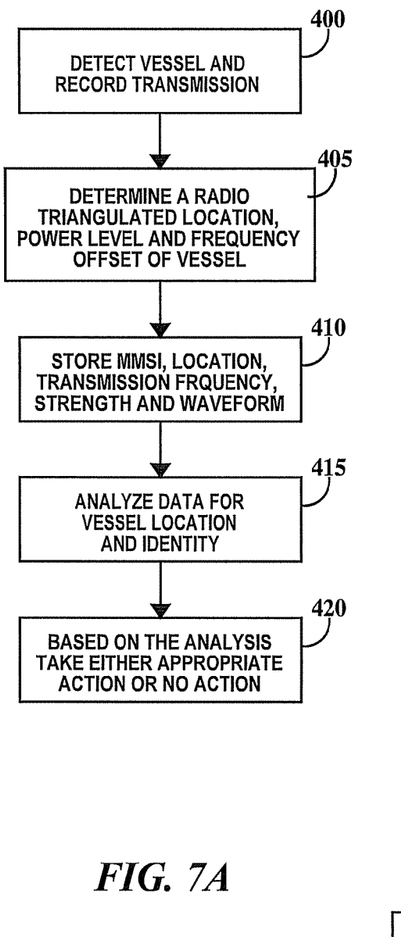
FIG. 7A is a flowchart of the overall method of vessel authentication and location validation according to embodiments of the present invention.

FIG. 7A is a flowchart of the overall method of vessel authentication and location validation according to embodiments of the present invention. In step 400 a vessel radio transmission is detected and recorded. The voice transmission, self-reported MMSI, self-reported geographical vessel location (if any) and one or more of the received transmission waveform, received transmission frequency, received transmission power level and the date/time of the received transmission are recorded at the central station. In step 405 a radio triangulated geographical vessel location is calculated, a transmitter power level is calculated and a transmitter frequency offset is calculated. In step 410, the self-reported MMSI, self-reported geographical vessel location (if any) and one or more of the received transmission waveform, received transmission frequency, received transmission power level, the date/time of the received transmission, triangulated geographical vessel location, calculated transmitter power level and the transmitter frequency offset are recorded. In step 415, the stored data is analyzed for vessel location and identity. In step 420, based on the analysis performed in step 420 either appropriate action or no action is taken. Appropriate actions include, but are not limited to, surveillance of the vessel and interception of the vessel.

Figure 7B:
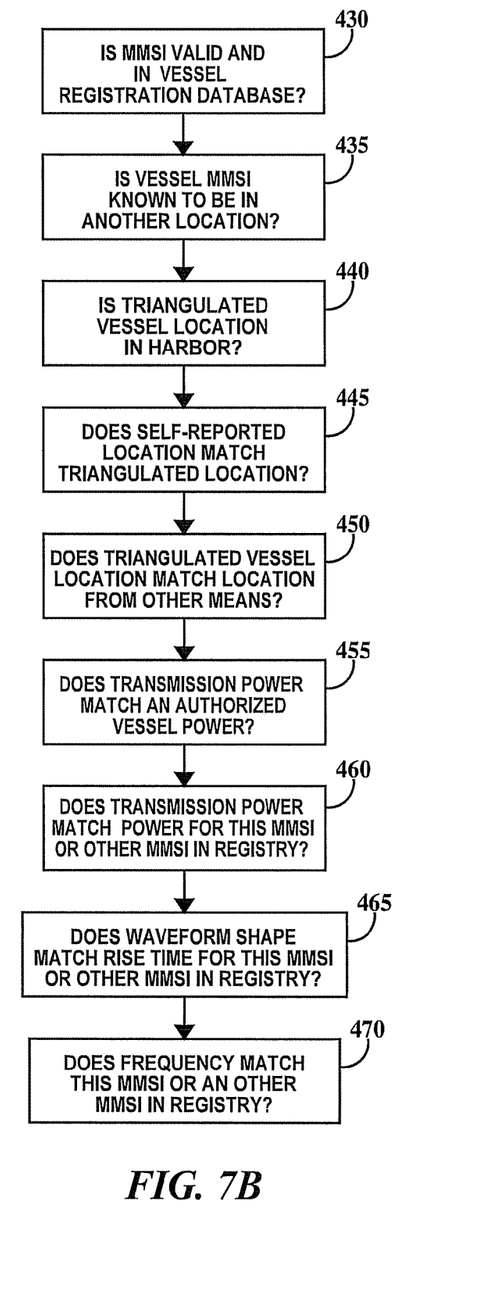
FIG. 7B is an expanded flowchart of the data analysis step of FIG. 7A.

FIG. 7B is an expanded flowchart of the data analysis step 415 of FIG. 7A. In step 430 it is determined if the self-reported MMSI is a valid number (i.e., conforms to the rules governing the makeup of MMSI identifiers) and is in the vessel registration database. In step 435, it is determined if the vessel MMSI is known (using the vessel registration database) to be in another location (e.g., in another port or in transit between two other ports). In step 440, it is determined if the triangulated geographical vessel location is actually in the harbor (e.g., is it in the water, is it in shipping channel, is it in the roadstead?). Step 440 also checks if the vessel is in a restricted or unauthorized area. In step 445, it is determined if the self-reported geographical vessel location matches the triangulated geographical vessel location. If no self-reported geographical vessel location was reported, step 445 is skipped. In step 450, it is optionally determined if the triangulated geographical vessel location matches vessel locations determined by other means. Examples of other means include RADAR, SONAR, and visual sightings. In step 455 it is determined if the calculated transmitter power matches that authorized for vessels in general. For example, a one watt or 100 watt transmitter may be suspicious. In step 460, it is determined if the calculated transmitter power matches that for the self-reported MMSI in the vessel registration database. In step 465 it is determined if the recorded waveform rise time or waveform shape matches that for the self-reported MMSI in the vessel registration database. In step 470 it is determined if the calculated frequency offset matches that for the self-reported MMSI in the vessel registration database. Steps 430, 455, 460, 465 and 470 are performed by the correlation station. Steps 435, 440, 445 and 450 are performed by the central station and are described in more detail in FIGS. 8, 9 and 10 (except for steps 610-625 of FIG. 10). Alternatively, the correlation station and central station may be merged into a single station.

Figure 8:
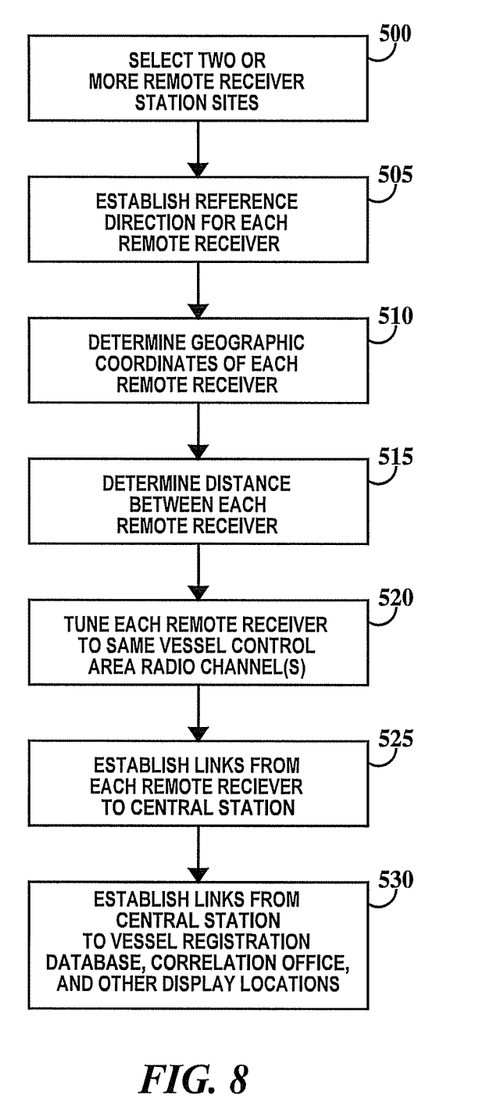
FIG. 8 is a flowchart for establishing the vessel authentication and location validation system according to embodiments of the present invention.

FIG. 8 is a flowchart for establishing the vessel authentication and location validation system according to embodiments of the present invention. In Step 500, two or more remote radio direction finder sites are selected. Three sites are preferred. In step 505, a reference direction is established for each remote receiver (e.g., each site could use true north as a reference direction.) Each site may use a different reference direction, but the same reference direction is preferred. In step 510, the geographic coordinates (e.g., latitude and longitude) of each receiver is determined. In step 520, each receiver is tuned to the same vessel control area channel or channels. It is preferred that each remote receiver is capable of receiving simultaneous transmissions on the same channel and is capable of receiving simultaneous transmissions on multiple channels. In step 525, communication links are established from each remote receiver station to the central station. The communications links should allow periodic calibration and synchronization of clocks at each of the remote receiver stations to a clock at the central station and to each other. In step 530, communication links are established from the central station to vessel registration data base, correlation office and other display locations.

Figure 9:
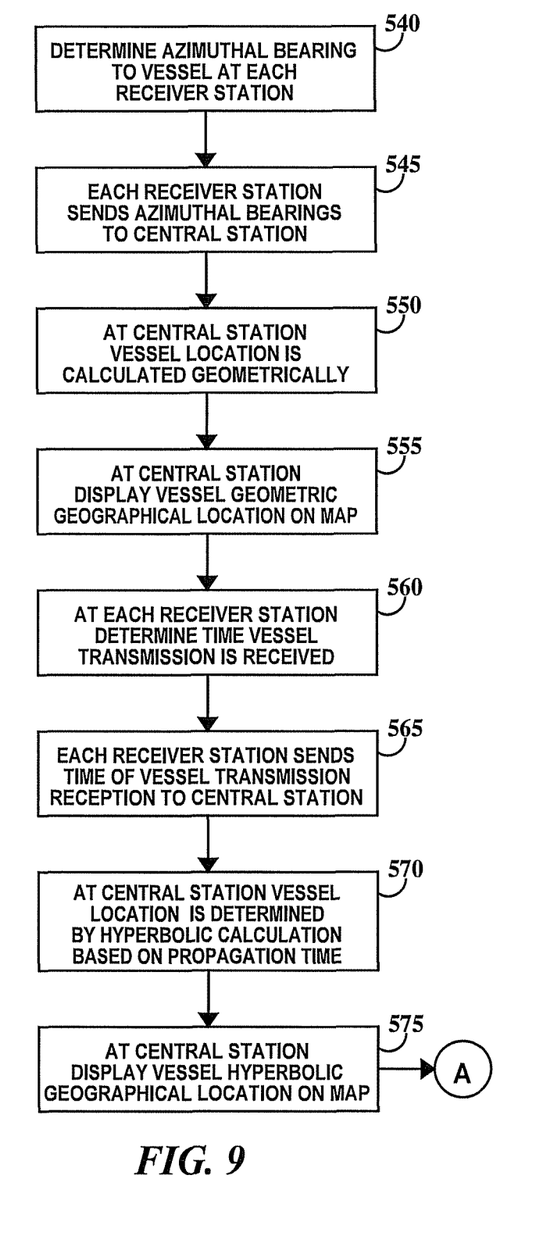
FIG. 9 is a flowchart illustrating operation of the vessel authentication and location validation system according to embodiments of the present invention.

FIG. 9 is a flowchart illustrating operation of the vessel authentication and location validation system according to embodiments of the present invention. In step 540, after receiving a vessel transmission, the azimuthal bearing from each remote receiver station is determined. In step 545, the azimuthal bearings are sent to the central station. In step 550, a triangulated geographical vessel location is calculated geometrically at the central station. In step 555, the geometrically determined triangulated geographical and the self-reported geometrical locations (if it exists) are displayed on a graphical representation (map) of the vessel control area. In one example, the graphical representation is displayed on display unit of a computer (e.g., a monitor). In step 560, each remote receiver determines the date and time of the received transmission and generates a timestamp. In step 565, each remote receiver sends the timestamp (attached to the bearing information) to the central station. In step 570, the triangulated geographical vessel location is determined by hyperbolic calculation based on radio transmission propagation time, the timestamps and the locations and distances between the remote receiver stations. In step 575, the geometrically determined triangulated geographical and the self-reported geometrical locations (if it exists) are displayed on a graphical representation of the vessel control area. In one example, the graphical representation is displayed on display unit of a computer (e.g., a monitor). If steps 550 and 555 were performed, the hyperbolically determined geographical vessel location may simply be added to the display. Note, only steps 550 and 555 or steps 560, 565, 570 and 575 need be done, but all steps 550 through 575 may be done as a double check. The method continues through connector "A" to FIG. 10.

Figure 10:
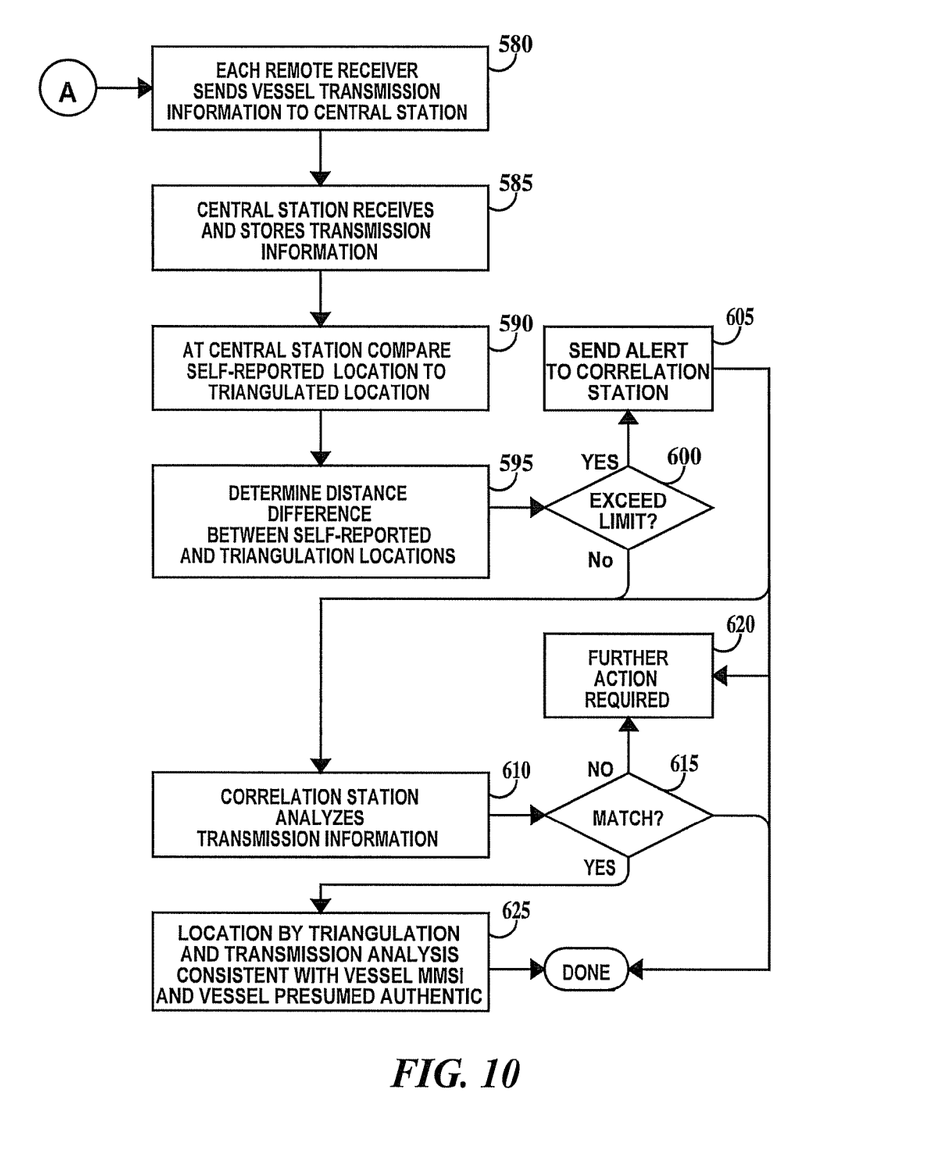
FIG. 10 is a continuation of the flowchart of FIG. 9.

FIG. 10 is a continuation of the flowchart of FIG. 9. Steps 580 and 585 are optional when the central station does not have a receiver. In step 580, each remote receiver sends the vessels transmission information to the central station. The transmission information includes, MMSI, frequency offset, power level, waveform data and timestamps. In step 585 the information from step 585 is received and stored by the central station. In step 590, the central station compares the self-reported geographical vessel location to the triangulated geographical vessel location. In step 595, the distance difference between the self-reported geographical vessel location and the triangulated geographical vessel location is determined. If a self-reported geographical vessel location does not exist, step 595 is skipped. Alternatively, for step 595, whether or not a self-reported geographical vessel location exists, step 595 may include checking if the triangulated geographical vessel location is in a restricted or unauthorized location. If the vessel is in a restricted or unauthorized location then the method proceeds to step 605 directly. In step 600, if the distance difference exceeds a predetermined limited the method proceeds to step 605, otherwise the method proceeds to step 610. In step 605 an alert along with vessel and location information is sent to the correlation office. The alert in step 605 will cause further action (see supra) in step 620. Steps 610 through 625 are performed by the correlation station. In step 610, vessel transmission information (e.g., is waveform, frequency offset, power level) compared by the correlation station to waveform, frequency offset and power level in the vessel registration database referenced by the self-reported MMSI. In step 615, if all of the waveform, frequency offset and power level match then the method proceeds to step 625. In step 615 if one or more of waveform, frequency offset and power level do not match then the method proceeds to step 620 and then terminates. In step 625, it is determined that the location by triangulation and analysis of the vessels radio transmission are consistent with the self-reported MMSI and self-reported location (if any) and the vessel is presumed authentic.

Generally, the method described herein with respect to vessel authentication and location validation is practiced with a general-purpose computer and the methods described supra in the flow diagrams of FIGS. 7A, 7B, 8, 9 and 10 may be coded as a set of instructions on removable or hard media for use by the general-purpose computer.

Figure 11:
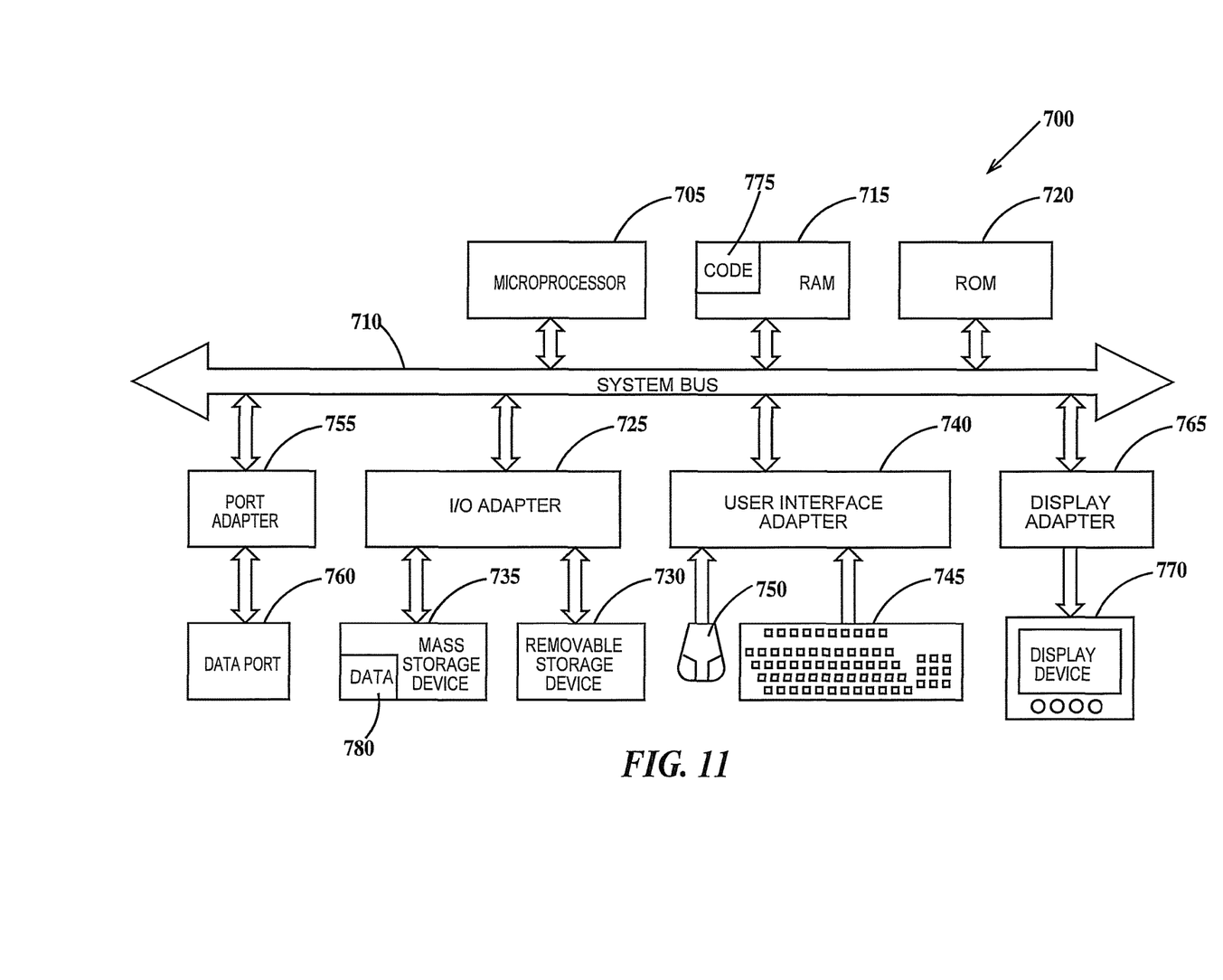
FIG. 11 is a schematic block diagram of a general-purpose computer.

FIG. 11 is a schematic block diagram of a general-purpose computer. In FIG. 11, computer system 700 has at least one microprocessor or central processing unit (CPU) 705. CPU 705 is interconnected via a system bus 710 to a random access memory (RAM) 715, a read-only memory (ROM) 720, an input/output (I/O) adapter 725 for a connecting a removable data and/or program storage device 730 and a mass data and/or program storage device 735, a user interface adapter 740 for connecting a keyboard 745 and a mouse 750, a port adapter 755 for connecting a data port 760 and a display adapter 765 for connecting a display device 770.

ROM 720 contains the basic operating system for computer system 700. The operating system may alternatively reside in RAM 715 or elsewhere as is known in the art. Examples of removable data and/or program storage device 730 include magnetic media such as floppy drives and tape drives and optical media such as CD ROM drives. Examples of mass data and/or program storage device 735 include electronic, magnetic, optical, electromagnetic, infrared, and semiconductor devices. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. In addition to keyboard 745 and mouse 750, other user input devices such as trackballs, writing tablets, pressure pads, microphones, light pens and position-sensing screen displays may be connected to user interface 740. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 730, fed through data port 760 or typed in using keyboard 745.

Thus, the embodiments of the present invention provide a method and system for vessel authentication and location validation.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A method, comprising:
   detecting a radio transmission from a target vessel in a vessel control area by two or more linked land based directional radio receivers distributed about said vessel control area;
   determining a time and date of said radio transmission;
   generating a triangulated geographical location of said radio transmission based only on bearings of said radio transmission from said two or more directional radio receivers;
   extracting a maritime mobile service identity from said radio transmission;
   extracting from said radio transmission a frequency, a power level and a waveform of said radio transmission; and
   authenticating or not authenticating said target vessel based on said triangulated geographical location and one or more of said frequency of said radio transmission, said power level of said radio transmission and said waveform of said radio transmission.

2. The method of claim 1, further including:
   extracting a self-identified geographical location from said radio transmission;
   comparing said self-identified geographical location to said triangulated geographical location;
   determining if a difference between said self-identified geographical location and said triangulated geographical location is within a present limit; and
   wherein said authenticating or not authenticating said target vessel is further based on whether or not said difference between said self-identified geographical location and said triangulated geographical location is within said present limit.

3. The method of claim 1, further including:
   determining if said maritime mobile service identity is that of a vessel known to be in another geographical location at said date and time of said radio transmission.

4. The method of claim 1, further including:
   determining if said maritime mobile service identity is that of a vessel known to have been at a previous geographical location at a previous date and time from which said vessel could not have traveled from in the amount of time elapsed between said previous date and time and said date and time of said radio transmission.

5. The method of claim 1, further including:
   determining if said power level matches, to predetermined criteria, a known power level associated with said maritime mobile service identity.

6. The method of claim 1, further including:
   determining if an offset of said frequency from a nominal frequency of a vessel communication radio channel used in said area of vessel control matches, to a predetermined criteria, a known frequency offset associated with said maritime mobile service identity; or
   determining if an offset of said frequency from a nominal frequency of a vessel communication radio channel used in said area of vessel control matches, to a predetermined criteria, a known frequency offset associated with a different maritime mobile service identity; or
   determining if an offset of said frequency from a nominal frequency of a vessel communication radio channel used in said area of vessel control matches, to a predetermined criteria, a known frequency offset associated with said maritime mobile service identity or a different maritime mobile service identity.

7. The method of claim 1, further including:
   determining if a signal amplitude as a function of time of said waveform matches, to a predetermined criteria, that of a known signal amplitude as a function of time associated with said maritime mobile service identity; or
   determining if a signal amplitude as a function of time of said waveform matches, to a predetermined criteria, that of a known signal amplitude as a function of time associated with a different maritime mobile service identity; or
   determining if a signal amplitude as a function of time of said waveform matches, to a predetermined criteria, that of a known signal amplitude as a function of time associated with said maritime mobile service identity or a different maritime mobile service identity.

8. The method of claim 1, further including:
   searching a vessel registration database by maritime mobile service identity and retrieving one or more of a known frequency, a known power level and a known waveform of a transmitter associated with said maritime mobile service identity, said vessel registration database containing vessel maritime mobile service identities and one or more known frequencies, known power levels and known waveforms of transmitters associated with respective maritime mobile service identities listed in said vessel registration database; and
   comparing one or more of said frequency, said power level and said waveform to a corresponding one or more of said known frequency, said known power level and said known waveform.

9. The method of claim 1, further including:
   searching a vessel registration database by waveform and retrieving a known maritime mobile service identity associated with said waveform, said vessel registration database containing vessel maritime mobile service identities and known waveforms of transmitters associated with respective maritime mobile service identities listed in said vessel registration database; and
   comparing said maritime mobile service identity to said known maritime mobile service identity.

10. The method of claim 1, further including:
    sending said maritime mobile service identity and one or more of said frequency, said transmitted power level and said waveform of said target vessel to a vessel registration database.

11. The method of claim 1, wherein said generating a triangulated geographical location of said radio transmission is based on azimuthal bearings from two or more radio receivers receiving said radio transmission or said generating a triangulated geographical location of said radio transmission is based on propagation time of said radio transmission to two or more radio receivers receiving said radio transmission.

12. The method of claim 1, further including:
    displaying said triangulated geographical location on a map of said vessel control area.

13. A system comprising:
    two or more land based remote receiver stations linked to a central station, each remote receiver station including a respective directional radio receiver, said central station including a computer comprising a processor, an address/data bus coupled to said processor, and a computer-readable memory unit coupled to communicate with said processor, said memory unit containing instructions that when executed by the processor implement a method for authenticating vessel identity and location in a vessel control area;

detecting a radio transmission from a target vessel in a vessel control area by said radio direction receivers of said two or more land based remote receiver stations, and after said detecting, said computer executing the computer implemented steps of:

determining a time and date of a radio transmission from a target vessel in a vessel control area;

generating a triangulated geographical location of said radio transmission based only on bearings of said radio transmission from said two or more directional radio receivers;

extracting and storing a maritime mobile service identity from said radio transmission;

extracting from said radio transmission a frequency, a power level and a waveform of said radio transmission; and authenticating or not authenticating said target vessel based on said triangulated geographical location and one or more of said frequency of said radio transmission, said power level of said radio transmission and said waveform of said radio transmission.

14. The system of claim 13, the method further including the step of:

extracting a self-identified geographical location from said radio transmission;

comparing said self-identified geographical location to said triangulated geographical location;

determining if a difference between said self-identified geographical location and said triangulated geographical location is within a present limit; and wherein said authenticating or not authenticating said target vessel is further based on whether or not said difference between said self-identified geographical location and said triangulated geographical location is within said present limit.

15. The system of claim 13, the method further including the step of:

determining if said maritime mobile service identity is that of a vessel known to be in another geographical location at said date and time of said radio transmission.

16. The system of claim 13, the method further including the step of:

determining if said maritime mobile service identity is that of a vessel known to have been at a previous geographical location at a previous date and time from which said vessel could not have traveled from in the amount of time elapsed between said previous date and time and said date and time of said radio transmission.

17. The system of claim 13, the method further including the step of:

determining if said power level matches, to predetermined criteria, a known power level associated with said maritime mobile service identity.

18. The system of claim 13, the method further including the step of:

determining if an offset of said frequency from a nominal frequency of a vessel communication radio channel used in said area of vessel control matches, to a predetermined criteria, a known frequency offset associated with said maritime mobile service identity; or determining if an offset of said frequency from a nominal frequency of a vessel communication radio channel used in said area of vessel control matches, to a predetermined criteria, a known frequency offset associated with a different maritime mobile service identity; or determining if an offset of said frequency from a nominal frequency of a vessel communication radio channel used in said area of vessel control matches, to a predetermined criteria, a known frequency offset associated with said maritime mobile service identity or a different maritime mobile service identity.

19. The system of claim 13, the method further including the step of:

determining if a signal amplitude as a function of time of said waveform matches, to a predetermined criteria, that of a known signal amplitude as a function of time associated with said maritime mobile service identity; or determining if a signal amplitude as a function of time of said waveform matches, to a predetermined criteria, that of a known signal amplitude as a function of time associated with a different maritime mobile service identity; or determining if a signal amplitude as a function of time of said waveform matches, to a predetermined criteria, that of a known signal amplitude as a function of time associated with said maritime mobile service identity or a different maritime mobile service identity.

20. The system of claim 13, the method further including the step of:

searching a vessel registration database by maritime mobile service identity and retrieving one or more of a known frequency, a known power level and a known waveform of a transmitter associated with said maritime mobile service identity, said vessel registration database containing vessel maritime mobile service identities and one or more known frequencies, known power levels and known waveforms of transmitters associated with respective maritime mobile service identities listed in said vessel registration database; and comparing one or more of said frequency, said power level and said waveform to a corresponding one or more of said known frequency said known power level and said known waveform.

21. The system of claim 13, the method further including the step of:

searching a vessel registration database by waveform and retrieving a known maritime mobile service identity associated with said waveform, said vessel registration database containing vessel maritime mobile service identities and known waveforms of transmitters associated with respective maritime mobile service identities listed in said vessel registration database; and comparing said maritime mobile service identity to said known maritime mobile service identity.

22. The system of claim 13, the method further including the step of:

sending said maritime mobile service identity and one or more of said frequency, said transmitted power level and said waveform of said target vessel to a vessel registration database.

23. The system of claim 13, wherein the step of generating a triangulated geographical location of said radio transmission is based on azimuthal bearings from two or more radio receivers receiving said radio transmission or said generating a triangulated geographical location of said radio transmission is based on propagation time of said radio transmission to two or more radio receivers receiving said radio transmission.

24. The system of claim 13, the method further including the step of:

displaying said triangulated geographical location on a map of said vessel control area.

25. A computer program product, comprising:
a computer useable storage medium having a computer readable program therein, wherein the computer readable program when executed on a computer causes the computer to:
receive information about a radio transmission from a target vessel in a vessel control area from two or more linked land based directional radio receivers detecting said transmission from said target vessel;
determine a time and date of said radio transmission from said information;
generate a triangulated geographical location of said radio transmission based only on bearings of said radio transmission received from said two or more directional radio receivers;
extract and store a maritime mobile service identity from said information;
extract from said information a frequency, a power level and a waveform of said radio transmission; and
authenticate or not authenticate said target vessel based on said triangulated geographical location and one or more of said frequency of said radio transmission, said power level of said radio transmission and said waveform of said radio transmission.

26. The method of claim 1, wherein said vessel control area is a harbor.

27. The method of claim 1, wherein said vessel control area is immediately adjacent to land.

28. The system of claim 13, wherein said vessel control area is a harbor.

29. The system of claim 13, wherein said vessel control area is immediately adjacent to land.

30. The computer program product of claim 25, wherein said vessel control area is a harbor.

31. The computer program product of claim 25, wherein said vessel control area is immediately adjacent to land.

* * * * *